(12) United States Patent
Tanuma et al.

(10) Patent No.: US 10,547,062 B2
(45) Date of Patent: Jan. 28, 2020

(54) POLYMER ELECTROLYTE FUEL CELL

(71) Applicant: AGC Inc., Chiyoda-ku (JP)

(72) Inventors: Toshihiro Tanuma, Chiyoda-ku (JP); Shinji Kinoshita, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 1146 days.

(21) Appl. No.: 14/242,005

(22) Filed: Apr. 1, 2014

(65) Prior Publication Data
US 2015/0044593 A1 Feb. 12, 2015

(30) Foreign Application Priority Data

Apr. 15, 2013 (JP) .................................. 2013-085045
Aug. 12, 2013 (JP) .................................. 2013-167828

(51) Int. Cl.
*H01M 8/0234* (2016.01)
*H01M 8/0239* (2016.01)
(Continued)

(52) U.S. Cl.
CPC ....... *H01M 8/0234* (2013.01); *H01M 8/0239* (2013.01); *H01M 8/0243* (2013.01);
(Continued)

(58) Field of Classification Search
CPC . H01M 8/0234; H01M 8/0239; H01M 8/0243
See application file for complete search history.

(56) References Cited

U.S. PATENT DOCUMENTS 8,007,953 B2   8/2011   Tanuma
8,202,570 B2   6/2012   Tanuma
(Continued)

FOREIGN PATENT DOCUMENTS

JP   2005293944 A   * 10/2005
JP   2006120506 A   *  5/2006
(Continued)

OTHER PUBLICATIONS

Machine Translation of JP 2006-120506 A.*
(Continued)

*Primary Examiner* — Jonathan G Jelsma
(74) *Attorney, Agent, or Firm* — Oblon, McClelland, Maier & Neustadt, L.L.P.

(57) ABSTRACT

To provide a polymer electrolyte fuel cell having a high cell voltage.

A polymer electrolyte fuel cell 1 comprising
  a membrane/electrode assembly 10 having a cathode catalyst layer 20, an anode catalyst layer 22 and a polymer electrolyte membrane 24 disposed between the cathode catalyst layer 20 and the anode catalyst layer 22,
  a porous first separator 12 disposed on the cathode catalyst layer 20 side of the membrane/electrode assembly 10,
  a second separator 18 disposed on the anode catalyst layer 22 side of the membrane/electrode assembly 10; and
  a cathode interlayer 14 disposed between the cathode catalyst layer 20 and the first separator 12 so as to be in direct contact with them,
  wherein the cathode interlayer 14 contains carbon fibers having an average fiber diameter of from 30 to 300 nm and an ion exchange resin.

10 Claims, 2 Drawing Sheets

(51) Int. Cl.
  *H01M 8/0243* (2016.01)
  *H01M 8/1018* (2016.01)
(52) U.S. Cl.
  CPC .............. *H01M 2008/1095* (2013.01); *H01M 2300/0082* (2013.01)

(56) References Cited

U.S. PATENT DOCUMENTS

| | | | |
|---|---|---|---|
| 8,475,967 B2 | 7/2013 | Tanuma | |
| 8,535,847 B2 | 9/2013 | Tanuma | |
| 2003/0118890 A1* | 6/2003 | Wittpahl | H01M 8/1004 427/115 |
| 2004/0033412 A1* | 2/2004 | Enjoji | H01M 4/926 429/509 |
| 2004/0115502 A1* | 6/2004 | Fukuda | H01M 4/8605 429/413 |
| 2008/0299430 A1* | 12/2008 | Ichikawa | H01M 4/8605 429/483 |
| 2009/0023028 A1* | 1/2009 | Sekine | H01M 4/926 429/435 |
| 2009/0258276 A1* | 10/2009 | Okoye | H01M 4/8605 429/406 |
| 2010/0003400 A1* | 1/2010 | Tanuma | H01M 8/1004 427/115 |
| 2010/0159301 A1 | 6/2010 | Tanuma | |
| 2010/0314038 A1 | 12/2010 | Tanuma | |
| 2012/0107722 A1* | 5/2012 | Satake | H01M 8/0247 429/492 |
| 2012/0321989 A1* | 12/2012 | Tanuma | H01M 4/8605 429/481 |
| 2013/0017472 A1* | 1/2013 | Chen | B32B 27/04 429/512 |
| 2013/0248360 A1* | 9/2013 | Osada | C25B 9/06 204/242 |
| 2014/0038077 A1* | 2/2014 | Takeuchi | H01M 4/8642 429/480 |
| 2014/0205919 A1* | 7/2014 | Wilde | H01M 4/8807 429/406 |

FOREIGN PATENT DOCUMENTS

| | | | |
|---|---|---|---|
| JP | 2006-164947 | 6/2006 | |
| WO | WO 2013041393 A1 * | 3/2013 | .......... H01M 4/8807 |

OTHER PUBLICATIONS

Machine translation of JP 2005-293944 A.*
U.S. Appl. No. 14/637,994, filed Mar. 4, 2015, Tanuma, et al.
U.S. Appl. No. 12/859,304, filed Aug. 19, 2010, US2010/0314038 A1, Tanuma.
U.S. Appl. No. 12/641,960, filed Dec. 18, 2009, US2010/0159301 A1, Tanuma.
Tetsuro Kariya et al. "Development of powder porous flow field type fuel cell separator", Sanyo Technical Report, vol. 17, No. 1, 2010, 7 pages.
Toshihiro Tanuma, et al., "Impact of gas diffusion layers (GDLs) on MEA performance in PEFCs", Fuel Cells 2012 Science & Technology—A Grove Fuel Cell Event, Energy Procedia 28 (2012) 12-19.

* cited by examiner 12 14　　　　16 18
　20 24 22
　　　10

12 14　　　　26 28
　20 24 22
　　　10

AA: Cathode interlayer+ GDL substrate
BB: GDL substrate alone

POLYMER ELECTROLYTE FUEL CELL

BACKGROUND OF INVENTION

Field of Invention

The present invention relates to a polymer electrolyte fuel cell.

Discussion of Background

As a polymer electrolyte fuel cell, e.g. a specific polymer electrolyte fuel cell is known which has a membrane/electrode assembly having a cathode catalyst layer and a gas diffusion layer provided on one surface of a polymer electrolyte membrane in this order, and an anode catalyst layer and a gas diffusion layer provided on the other surface in this order; and separators disposed on both sides of the membrane/electrode assembly. The gas diffusion layer performs a function to diffuse air or fuel gas in the electrode and a function to discharge water formed in the electrode.

As a separator, a non-porous separator (e.g. a metal separator or a carbon separator) having a plurality of gas flow paths formed, has been widely used. However, in the case of a polymer electrolyte fuel cell using the non-porous separator, supply of gas tends to be non-uniform between a portion in contact with the gas flow paths of the separator and a portion not in contact with the gas flow paths, in the gas diffusion layer. As a result, in such a polymer electrolyte fuel cell, supply of gas to a cathode catalyst layer and an anode catalyst layer tends to be non-uniform, whereby a high cell voltage is hardly obtained.

Accordingly, it has been proposed to use a porous separator for a polymer electrolyte fuel cell in which gas can be uniformly supplied to a cathode catalyst layer and an anode catalyst layer with which a higher cell voltage can be obtained. For example, the following polymer electrolyte fuel cells (i) and (ii) are mentioned.

(i) A polymer electrolyte fuel cell comprising a membrane/electrode assembly having a gas diffusion layer, a cathode catalyst layer, a polymer electrolyte membrane, an anode catalyst layer and a gas diffusion layer disposed in this order, and current collector layers (separators) made of a gas permeable metal porous product disposed on both sides of the membrane/electrode assembly (Patent Document 1).

(ii) A polymer electrolyte fuel cell comprising a membrane/electrode assembly having a gas diffusion layer, a cathode catalyst layer, a polymer electrolyte membrane, an anode catalyst layer and a gas diffusion layer disposed in this order, and separators of which a portion in contact with the membrane/electrode assembly is formed from a sintered porous product made of a metal powder, disposed on both sides of the membrane/electrode assembly (Non-Patent Document 1).

PRIOR ART DOCUMENTS

Patent Document

Patent Document 1: JP-A-2006-164947

Non-Patent Document

Non-Patent Document 1: Sanyo Technical Report Vol. 17 (2010) No. 1 p. 35-41

SUMMARY OF INVENTION

However, in the fields of automobiles and industries, further downsizing and high output of a fuel cell have been required. Accordingly, it is important to obtain a polymer electrolyte fuel having a higher cell voltage and more excellent power generation performance than the polymer electrolyte fuel cells (i) and (ii).

The present invention provides a polymer electrolyte fuel cell having high power generation performance.

The polymer electrolyte fuel cell of the present invention comprises a membrane/electrode assembly having a cathode catalyst layer, an anode catalyst layer and a polymer electrolyte membrane disposed between the cathode catalyst layer and the anode catalyst layer, a porous first separator disposed on the cathode catalyst layer side of the membrane/electrode assembly, a second separator disposed on the anode catalyst layer side of the membrane/electrode assembly; and a cathode interlayer disposed between the cathode catalyst layer and the first separator so as to be in direct contact with them, wherein the cathode interlayer contains carbon fibers having an average fiber diameter of from 30 to 300 nm and an ion exchange resin.

It is preferred that the cathode interlayer has pores with a pore diameter of from 0.1 to 2.0 µm.

It is preferred that the first separator has an average pore diameter of from 20 to 500 µm.

It is preferred that the cathode interlayer has a thickness of from 20 to 60 µm.

In the polymer electrolyte fuel cell of the present invention, it is preferred that the second separator is a porous separator, and said polymer electrolyte fuel cell has an anode interlayer containing carbon fibers having an average fiber diameter of from 30 to 300 nm and an ion exchange resin, which is disposed between the anode catalyst layer and the second separator so as to be in direct contact with them.

It is preferred that the anode interlayer has pores with a pore diameter of from 0.1 to 2.0 µm.

It is preferred that the second separator has an average pore diameter of from 20 to 500 µm.

It is preferred that the anode interlayer has a thickness of from 20 to 60 µm.

According to the polymer electrolyte fuel cell of the present invention, it is possible to obtain a high generation performance.

DETAILED DESCRIPTION OF PREFERRED EMBODIMENTS

In this specification, repeating units represented by the formula (U1) will be referred to as units (U1). The same applies to repeating units represented by other formulae.

Further, in this specification, a compound represented by the formula (M1) will be referred to as a compound (M1). The same applies to compounds represented by other formulae.

The repeating units in this specification mean units derived from a monomer, formed by polymerization of such a monomer. The repeating units may be units formed directly by a polymerization reaction, or may be such that some of such units are converted to another structure by treatment of the polymer.

The monomer in the present invention means a compound having a carbon-carbon double bond with polymerizability.

The ion exchange group in this specification means a group having $H^+$, a monovalent metal cation, an ammonium ion or the like. The ion exchange group may, for example, be a sulfonic acid group, a sulfonimide group or a sulfonmethide group.

The precursor group in this specification means a group capable of being converted to an ion exchange group by known treatment such as hydrolysis treatment or treatment for conversion to an acid form. The precursor group may, for example, be a $-SO_2F$ group.

«Polymer Electrolyte Fuel Cell»

<First Embodiment>

Figure 1:
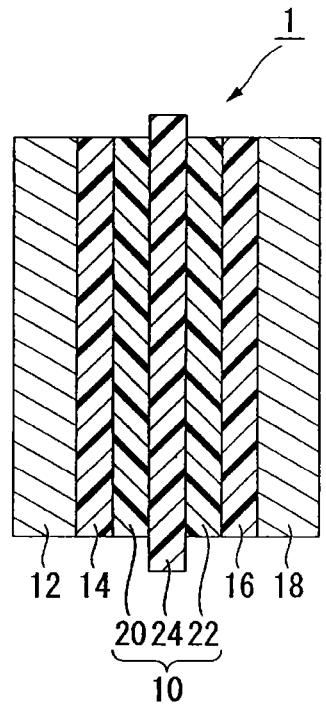
FIG. 1 is a cross-sectional view illustrating one example of the polymer electrolyte fuel cell of the present invention.

FIG. 1 is a cross-sectional view illustrating one example of the polymer electrolyte fuel cell of the present invention.

As shown in FIG. 1, a polymer electrolyte fuel cell 1 (hereinafter referred to as "fuel cell 1") in this embodiment comprises a first separator 12, a cathode interlayer 14, a membrane/electrode assembly 10, an anode interlayer 16 and a second separator 18. The membrane/electrode assembly 10 comprises a cathode catalyst layer 20, an anode catalyst layer 22, and a polymer electrolyte membrane 24 disposed between the cathode catalyst layer 20 and the anode catalyst layer 22.

The first separator 12 is disposed on the cathode catalyst layer 20 side of the membrane/electrode assembly 10. The cathode interlayer 14 is disposed between the cathode catalyst layer 20 of the membrane/electrode assembly 10 and the first separator 12 so as to be in direct contact with the cathode catalyst 20 and the first separator 12. The second separator 18 is disposed on the anode catalyst layer 22 side of the membrane/electrode assembly 10. The anode interlayer 16 is disposed between the anode catalyst layer 22 of the membrane/electrode assembly 10 and the second separator 18 so as to be in direct contact with the anode catalyst layer 22 and the second separator 18.

<First Separator>

The first separator 12 is an electrically conductive porous separator.

As the porous separator to be used as the first separator 12, it is possible to use a known porous separator to be used for a polymer electrolyte fuel cell, such as a foamed metal plate, a sintered body of metal fibers or a sintered body of metal powder.

The average pore diameter of the first separator 12 is preferably from 20 to 500 μm, more preferably from 50 to 400 μm. When the average pore diameter of the first separator 12 is at least the lower limit, the gas permeability of the first separator 12 will be good, and therefore gas can easily be supplied sufficiently to the cathode catalyst layer 20, whereby a high cell voltage tends to be obtained. When the average pore diameter of the first separator 12 is at most the upper limit, the contact resistance with the cathode interlayer 14 will be small, whereby a high cell voltage tends to be obtained.

Here, the average pore diameter of the porous separator as the first separator 12 is obtained in such a manner that pores are photographed by a scanning electron microscope (SEM) or an optical microscope to obtain an image of the pores, 100 pores are randomly selected and their pore diameters are measured by an image dimension measurement/particle measurement soft, and the average of the measured value is obtained.

The thickness of the first separator 12 is preferably from 0.1 to 1.5 mm, more preferably from 0.3 to 1.2 mm. When the thickness of the first separator 12 is at least the lower limit, the gas permeability will be good, whereby gas can easily be supplied sufficiently to the cathode catalyst layer 20. When the thickness of the first separator 12 is at most the upper limit, the contact resistance with the cathode interlayer 14 will be small, whereby a high cell voltage tends to be obtained.

<Cathode Interlayer>

The cathode interlayer 14 is an electrically conductive layer containing carbon fibers having an average fiber diameter of from 30 to 300 nm and an ion exchange resin.

When the average fiber diameter of the carbon fibers contained in the cathode interlayer 14 is at least 30 nm, such an interlayer has good gas diffusion property and water-discharging property, and when the average fiber diameter of the carbon fibers is at most 300 nm, the carbon fibers can suitably be dispersed in a dispersion medium. Further, by the cathode interlayer 14 containing an ion exchange resin, drying of the cathode catalyst layer 20 and the polymer electrolyte membrane 24 will be suppressed, and further the contact resistance between the first separator 12 and the cathode interlayer 14 will be small, whereby a high cell voltage tends to be obtained.

The average fiber diameter of the carbon fibers is from 30 to 300 nm, preferably from 50 to 200 nm.

Here, the average fiber diameter of the carbon fibers is an average of diameters of 20 carbon fibers measured by an electron microscope.

The carbon fibers may, for example, be vapor phase-grown carbon fibers, carbon nanotubes (single-wall, double-wall, multiwall or cup-stacked-type, etc.), polyacrylonitrile (PAN) type carbon fibers or pitch type carbon fibers.

As the form of the carbon fibers, chopped fibers or milled fibers may, for example, be mentioned.

The carbon fibers contained in the cathode interlayer 14 may be one type or two or more types.

The ion exchange resin contained in the cathode interlayer 14 is preferably a fluorinated ion exchange resin, more preferably a perfluorocarbon polymer having ionic groups (which may contain an etheric oxygen atom), in view of durability. The perfluorocarbon polymer is preferably the following polymer (H) or polymer (Q).

Polymer (H):

The polymer (H) is a copolymer having units based on tetrafluoroethylene (hereinafter referred to as "TFE") and units (U1):

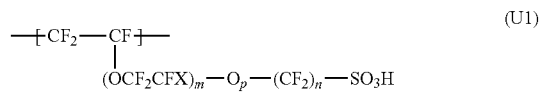

wherein X is a fluorine atom or a trifluoromethyl group, m is an integer of from 0 to 3, n is an integer of from 1 to 12, and p is 0 or 1.

The polymer (H) is obtained in such a manner that a mixture of TFE and the following compound (M1) is polymerized to obtain a precursor polymer, and then a $-SO_2F$ group in the precursor polymer is converted to a sulfonic acid group. The conversion of the —SO$_2$F group to a sulfonic acid group is carried out by hydrolysis and conversion to an acid form.

$$CF_2=CF(OCF_2CFX)_m-O_p-(CF_2)_n-SO_2F \quad (M1)$$

wherein X is a fluorine atom or a trifluoromethyl group, m is an integer of form 0 to 3, n is an integer of from 1 to 12, and p is 0 or 1.

The compound (M1) is preferably compounds (M1-1) to (M1-3).

$$CF_2=CFO(CF_2)_{n1}SO_2F \quad (M1-1),$$

$$CF_2=CFOCF_2CF(CF_3)O(CF_2)_{n2}SO_2F \quad (M1-2),$$

$$CF_2=CF(OCF_2CF(CF_3))_{m3}O(CF_2)_{n3}SO_2F \quad (M1-3).$$

wherein each of n1, n2 and n3 is an integer of form 1 to 8, and m3 is an integer of form 2 to 3.

Polymer (Q):

The polymer (Q) is a copolymer having units (U2) and (U3):

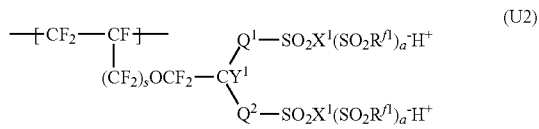

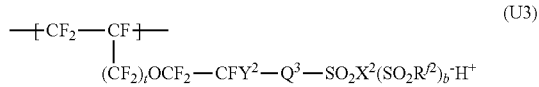

wherein Q$^1$ is a perfluoroalkylene group which may have an etheric oxygen atom, Q$^2$ is a single bond or a perfluoroalkylene group which may have an etheric oxygen atom, R$^{f1}$ is a perfluoroalkyl group which may have an etheric oxygen atom, X$^1$ is an oxygen atom, a nitrogen atom or a carbon atom, a is 0 when X$^1$ is an oxygen atom, 1 when X$^1$ is a nitrogen atom, and 2 when X$^1$ is a carbon atom, Y$^1$ is a fluorine atom or a monovalent perfluoro organic group, s is 0 or 1, Q$^3$ is a single bond or a perfluoroalkylene group which may have an etheric oxygen atom, R$^{f2}$ is a perfluoroalkyl group which may have an etheric oxygen atom, X$^2$ is an oxygen atom, a nitrogen atom or a carbon atom, b is 0 when X$^2$ is an oxygen atom, 1 when X$^2$ is a nitrogen atom, and 2 when X$^2$ is a carbon atom, Y$^2$ is a fluorine atom or a monovalent perfluoro organic group, and t is 0 or 1.

The single bond means that the carbon atom of CY$^1$ or CY$^2$ is directly bonded to the sulfur atom of SO$_2$.

The organic group means a group containing at least one carbon atom. Units (U2):

In a case where the perfluoroalkylene group for Q$^1$ or Q$^2$ has an etheric oxygen atom, the number of such oxygen atoms may be one or more. Further, such an oxygen atom may be inserted in a carbon atom-carbon atom bond of the perfluoroalkylene group, or may be inserted at the terminal of a carbon atom bond.

The perfluoroalkylene group may be linear or branched, preferably linear.

The number of carbon atoms in the perfluoroalkylene group is preferably from 1 to 6, more preferably from 1 to 4. When the number of carbon atoms is at most 6, the boiling point of the fluoromonomer as the starting material tends to be low, whereby purification by distillation will be easy.

Q$^2$ is preferably a C$_{1-6}$ perfluoroalkylene group which may have an etheric oxygen atom. When Q$^2$ is a C$_{1-6}$ perfluoroalkylene group which may have an etheric oxygen atom, the polymer electrolyte fuel cell will be excellent in the stability of the power generation performance when it is operated over a long period, as compared with a case where Q$^2$ is a single bond.

It is preferred that at least one of Q$^1$ and Q$^2$ is a C$_{1-6}$ perfluoroalkylene group having an etheric oxygen atom. The fluorinated monomer having a C$_{1-6}$ perfluoroalkylene group having an etheric oxygen atom can be prepared without a fluorination reaction by fluorine gas, whereby the yield is good, and the production is easy.

The perfluoroalkyl group for R$^{f1}$ may be linear or branched, preferably linear.

The number of carbon atoms in the perfluoroalkyl group is preferably from 1 to 6, more preferably from 1 to 4. The perfluoroalkyl group is preferably a perfluoromethyl group or a perfluoroethyl group.

In a case where units (U2) have at least two R$^{f1}$, the plurality of R$^{f1}$ may be the same or different from one another.

The —(SO$_2$X$^1$(SO$_2$R$^{f1}$)$_a$)$^-$H$^+$ group is an ionic group.

The —(SO$_2$X$^1$(SO$_2$R$^{f1}$)$_a$)$^-$H$^+$ group may, for example, be a sulfonic acid group (—SO$_3$$^-$H$^+$ group), a sulfonimide group (—SO$_2$N(SO$_2$R$^{f1}$)$^-$H$^+$ group), or a sulfonmethide group (—SO$_2$C(SO$_2$R$^{f1}$)$_2$$^-$H$^+$ group).

Y$^1$ is preferably a fluorine atom or a C$_{1-6}$ linear perfluoroalkyl group which may have an etheric oxygen atom.

Units (U2) are preferably units (U2-1), more preferably units (U2-11), units (U2-12) or units (U2-13), since production of the polymer (Q) is thereby easy, and industrial application is easy.

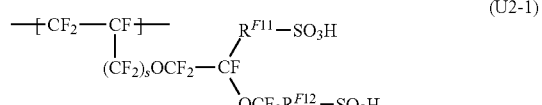

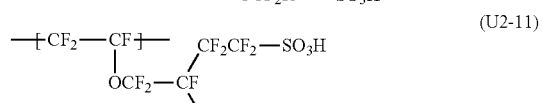

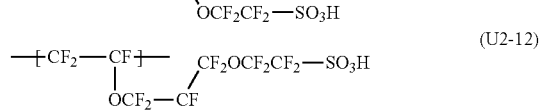

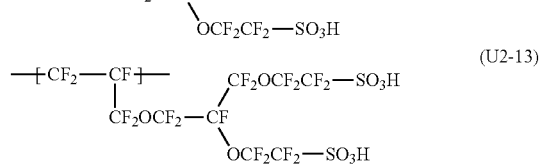

wherein R$^{F11}$ is a single bond or a C$_{1-6}$ linear perfluoroalkylene group which may have an etheric oxygen atom, and R$^{F12}$ is a C$_{1-6}$ linear perfluoroalkylene group.

Units (U3):

In a case where the perfluoroalkylene group for Q$^3$ has an etheric oxygen atom, the number of such oxygen atoms may be one or more. Further, such an oxygen atom may be inserted in a carbon atom-carbon atom bond of the perfluoroalkylene group, or may be inserted at the terminal of a carbon atom bond.

The perfluoroalkylene group may be liner or branched.

The number of carbon atoms in the perfluoroalkylene group is preferably from 1 to 6, more preferably from 1 to 4.

The perfluoroalkyl group for $R^{f2}$ may be linear or branched, preferably linear.

The number of carbon atoms in the perfluoroalkyl group is preferably from 1 to 6, more preferably from 1 to 4. The perfluoroalkyl group is preferably a perfluoromethyl group or a perfluoroethyl group.

The —$(SO_2X^2(SO_2R^{f2})_b)^-H^+$ group is an ionic group.

The —$(SO_2X^2(SO_2R^{f2})_b)^-H^+$ group may, for example, be a sulfonic acid group (—$SO_3^-H^+$ group), a sulfonimide group (—$SO_2N(SO_2R^{f2})^-H^+$ group), or a sulfonmethide group (—$SO_2C(SO_2R^{f2})_2)^-H^+$ group).

$Y^2$ is preferably a fluorine atom or a trifluoromethyl group.

Units (U3) are preferably units (U3-1), more preferably units (U3-11), units (U3-12), units (U3-13) or units (U3-14), since production of the polymer (Q) is thereby easy, and industrial application is easy.

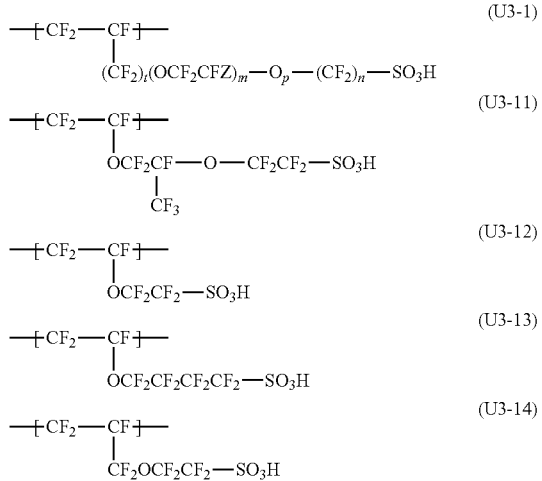

wherein Z is a fluorine atom or a trifluoromethyl group, m is an integer of from 0 to 3, n is an integer of from 1 to 12, and p is 0 or 1, provided that m+p>0.

Other Units:

The polymer (Q) may further have repeating units based on the after-described other monomers (hereinafter referred to as other units). The proportion of such other units may suitably be adjusted so that the ion exchange capacity of the polymer (Q) will be within the after-mentioned preferred range.

Such other units are preferably repeating units based on a perfluoromonomer, more preferably repeating units based on tetrafluoroethylene (hereinafter, referred to as TFE), from the viewpoint of mechanical strength and chemical durability.

The proportion of repeating units based on TFE is preferably at least 20 mol %, more preferably at least 40 mol %, based on the total repeating units (100 mol %) constituting the polymer (Q), from the viewpoint of the mechanical strength and chemical durability.

The proportion of repeating units based on TFE is preferably at most 92 mol %, more preferably at most 87 mol %, based on the total repeating units (100 mol %) constituting the polymer (Q) from the viewpoint of the electrical resistance.

The polymer (Q) may have units (U2), units (U3) and other units, each being one type only, or two or more types.

The polymer (Q) is preferably a perfluoropolymer from the viewpoint of the chemical durability.

The ion exchange capacity of the ion exchange resin in the cathode interlayer 14 is preferably from 0.5 to 2.0 meq/g dry resin, particularly preferably from 0.8 to 1.5 meq/g dry resin, from the viewpoint of the electrical conductivity and gas permeability.

The ion exchange resin contained in the cathode interlayer 14 may be one type, or two or more types.

The cathode interlayer 14 may contain carbon particles.

The carbon particles contained in the cathode interlayer 14 may, for example, be carbon black.

The carbon particles contained in the cathode interlayer 14 may be one type or two or more types.

The content of the carbon fibers in the cathode interlayer 14 (100 mass %) is preferably from 45 to 85 mass %, more preferably from 50 to 75 mass %. When the content of the carbon fibers is at least the lower limit, the cathode interlayer 14 having good gas permeability can easily be obtained. When the content of the carbon fibers is at most the upper limit, it is possible to relatively increase the amount of the ion exchange resin, the moisture retention of the cathode interlayer 14 is more increased, whereby drying of the cathode catalyst layer 20 can easily be suppressed.

The content of the ion exchange resin in the cathode interlayer 14 (100 mass %) is preferably from 15 to 55 mass %, more preferably from 25 to 50 mass %. When the content of the ion exchange resin is at least the lower limit, the moisture retention of the cathode interlayer 14 is more increased, whereby drying of the cathode catalyst layer 20 and the polymer electrolyte membrane 24 can easily be suppressed. When the content of the ion exchange resin is at most the upper limit, it is possible to relatively increase the amount of carbon fibers, and therefore a cathode interlayer having good gas permeability can easily be obtained.

The mass ratio ($M_B/M_A$) of the ion exchange resin (mass: $M_B$) to the carbon fibers (mass: $M_A$) in the cathode interlayer 14 is preferably from 0.2 to 1.2, more preferably from 0.3 to 0.8. When $M_B/M_A$ is at least the lower limit, the moisture retention of the cathode interlayer 14 is more increased, whereby drying of the cathode catalyst layer 20 and the polymer electrolyte membrane 24 can readily be suppressed. When $M_B/M_A$ is at most the upper limit, the cathode interlayer 14 having good gas permeability can easily be obtained.

In a case where carbon particles are contained in the cathode interlayer 14, the content of the carbon particles in the cathode interlayer 14 (100 mass %) is preferably from 3 to 50 mass %, more preferably from 5 to 40 mass %.

The pore diameter of pores in the cathode interlayer 14 is preferably from 0.1 to 2.0 μm, more preferably from 0.3 to 1.0 μm. When the pore diameter of pores in the cathode interlayer 14 is at least the lower limit, the gas permeability of the cathode interlayer 14 will be more excellent, and therefore gas can sufficiently be supplied to the cathode catalyst layer 20, whereby a high cell voltage can be obtained. When the pore diameter of pores in the cathode interlayer 14 is at most the upper limit, the gas permeability of the cathode interlayer 14 will not be too high, and therefore drying of the cathode catalyst layer 20 and the polymer electrolyte membrane 24 can be further suppressed, and therefore the contact resistance between the first separator 12 and the cathode interlayer 14 will be small, whereby a high cell voltage can be obtained.

Here, the pore diameter of pores in the cathode interlayer means a value of a pore diameter at a peak top, derived from the cathode interlayer, in a pore distribution obtained by measurement with respect to a cathode interlayer formed in a thickness of 30 µm on a commercially available gas diffusion layer, by means of a mercury injection method.

The pore diameter of pores in the cathode interlayer 14 is smaller when, for example, the content of the carbon fibers is lower. Further, the shorter the fiber length of the carbon fibers contained is, the smaller the pore diameter of pores in the cathode interlayer 14 is.

The cathode interlayer 14 may be one consisting of only one layer, or one having a plurality of layers having different components, composition, etc. laminated. When the cathode interlayer 14 is made of at least two layers, the pore diameter of pores in each layer satisfies the above range.

In a case where the cathode interlayer 14 is made of at least two layers, it is preferred that the pore diameter of pores in each layer satisfies the above range.

The thickness of the cathode interlayer 14 is preferably from 20 to 60 µm, more preferably from 30 to 50 µm. When the thickness of the cathode interlayer 14 is at least the lower limit, good moisture retention can easily be obtained, and therefore drying of the cathode catalyst layer 20 and the polymer electrolyte membrane 24 can easily be suppressed. When the thickness of the cathode interlayer 14 is at most the upper limit, a cathode interlayer having good gas diffusion property and water-discharging property can easily be obtained.

The thickness of the cathode interlayer is a value obtained in such a manner that a cross section of the cathode interlayer is observed by SEM, thicknesses at three portions are measured, and they are averaged to obtain the thickness.

[Membrane/Electrode Assembly]

The membrane/electrode assembly 10 is an assembly having the cathode catalyst layer 20, the polymer electrolyte membrane 24 and the anode catalyst layer 22 assembled in this order.

(Cathode Catalyst Layer)

The cathode catalyst layer 20 is a layer containing a catalyst and an ion exchange resin.

The cathode catalyst layer 20 may be one consisting of only one layer, or one having a plurality of layers having different components, composition, etc. laminated.

The catalyst may be any catalyst so long as it accelerates an oxidation/reduction reaction in a fuel cell, and it is preferably a catalyst containing platinum, particularly preferably a supported catalyst having platinum or a platinum alloy supported on a carbon carrier.

The carbon carrier may, for example, be activated carbon or carbon black, and it is preferably graphitized by e.g. heat treatment, since its chemical durability is high.

The specific surface area of the carbon carrier is preferably at least 200 m$^2$/g. The specific surface area of the carbon carrier is measured by a BET specific surface area device by adsorption of nitrogen on a carbon surface.

The platinum alloy is preferably an alloy of platinum with at least one metal selected from the group consisting of platinum group metals excluding platinum (such as ruthenium, rhodium, palladium, osmium and iridium), gold, silver, chromium, iron, titanium, manganese, cobalt, nickel, molybdenum, tungsten, aluminum, silicon, zinc and tin.

The amount of platinum or a platinum alloy supported is preferably from 10 to 70 mass %, based on the supported catalyst (100 mass %).

The catalyst contained in the cathode catalyst layer 20 may be one type, or two or more types.

The ion exchange resin to be used for the cathode catalyst layer 20 is preferably a fluorinated ion exchange resin, more preferably a perfluorocarbon polymer having ionic groups (which may contain an etheric oxygen atom), particularly preferably the above-mentioned polymer (H) or the polymer (Q), from the viewpoint of the durability.

The ion exchange resin contained in the cathode catalyst layer 20 may be the same or different from the ion exchange resin contained in the cathode interlayer 14.

The ion exchange resin contained in the cathode catalyst layer 20 may be one type or two or more types.

The ion exchange capacity of the ion exchange resin in the cathode catalyst layer 20 is preferably from 0.5 to 2.0 meq/g dry resin, particularly preferably from 0.8 to 1.5 meq/g dry resin, from the viewpoint of the electrical conductivity and gas permeability.

The amount of platinum contained in the cathode catalyst layer 20 is preferably from 0.01 to 0.5 mg/cm$^2$ from the viewpoint of the optimum thickness to carry out the electrode reaction efficiently, more preferably from 0.05 to 0.35 mg/cm$^2$ from the viewpoint of the balance of the cost of materials and the performance.

The thickness of the cathode catalyst layer 20 is preferably at most 20 µm, more preferably from 1 to 15 µm, with a view to facilitating the gas diffusion in the catalyst layer and improving the power generation performance of the polymer electrolyte fuel cell. Further, the thickness of the cathode catalyst layer 20 is preferably uniform. If the thickness of the catalyst layer is made thin, the amount of the catalyst present per unit area decreases, and the reaction activity is likely to be low. In such a case, by using a supported catalyst wherein platinum or a platinum alloy is supported at a high supported ratio, it is possible to maintain the reaction activity of the electrode to be high without deficiency of the catalyst amount even if the catalyst layer is thin.

The thickness of the cathode catalyst layer is a value obtained in such a manner that a cross section of the cathode catalyst layer is observed by SEM, thicknesses at three portions are measured, and then they are averaged to obtain the thickness.

(Anode Catalyst Layer)

The anode catalyst layer 22 is a layer containing a catalyst and an ion exchange resin.

The catalyst contained in the anode catalyst layer 22 may be the same catalyst mentioned in the cathode catalyst layer 20, and the preferred embodiment is also the same.

The catalyst contained in the anode catalyst layer 22 may be the same or different from the catalyst contained in the cathode catalyst layer 20. Further, the catalyst contained in the anode catalyst layer 22 may be one type or two or more types.

The ion exchange resin in the anode catalyst layer 22 is preferably a fluorinated ion exchange resin, more preferably a perfluorocarbon polymer having ionic groups (which may have an etheric oxygen atom), particularly preferably the above-mentioned polymer (H) or polymer (Q), from the viewpoint of the durability.

The ion exchange resin contained in the anode catalyst layer 22 may be the same or different from the ion exchange resin contained in the cathode catalyst layer 20. Further, the ion exchange resin contained in the anode catalyst layer 22 may be one type or two or more types.

The component, composition, thickness, etc. of the anode catalyst layer 22 may be the same or different from those of the cathode catalyst layer 20. Further, the anode catalyst layer 22 may be one consisting of only one layer or one having a plurality of layers having different components, composition, etc. laminated.

The amount of platinum contained in the anode catalyst layer 22 is preferably from 0.01 to 0.5 mg/cm$^2$, more preferably from 0.05 to 0.35 mg/cm$^2$, from the same reason as in the case of the cathode catalyst layer 20.

The thickness of the anode catalyst layer 22 is preferably at most 20 μm, more preferably from 1 to 15 μm from the same reason as in the case of the cathode catalyst layer 20. Further, it is preferred that the thickness of the anode catalyst layer 22 is uniform.

The thickness of the anode catalyst layer is a value obtained in such a manner that a cross section of the anode catalyst layer is observed by SEM, thicknesses at three portions are measured, and they are averaged to obtain the thickness.

(Polymer Electrolyte Membrane)

The polymer electrolyte membrane 24 is one containing an ion exchange resin, and a reinforcing member as the case requires. The polymer electrolyte membrane 24 may be one having a multi-layered structure having a plurality of ion exchange resin films bonded.

The ion exchange resin is preferably a fluorinated ion exchange resin, more preferably a perfluorocarbon polymer having ionic groups (which may have an etheric oxygen atom), particularly preferably the above-mentioned polymer (H) or polymer (Q), from the viewpoint of the durability.

The ion exchange capacity of the ion exchange resin in the polymer electrolyte membrane 24 is preferably from 0.5 to 2.0 meq/g dry resin, particularly preferably from 0.8 to 1.5 meq/g dry resin.

The ion exchange resin contained in the polymer electrolyte membrane 24 may be one type or two or more types.

The form of the reinforcing member may, for example, be a porous product, fibers, woven fabric or non-woven fabric. The form of the reinforcing member is preferably a porous product in view of the mechanical strength.

The material of the reinforcing member may, for example, be polytetrafluoroethylene (hereinafter referred to as PTFE), a TFE/hexafluoropropylene copolymer, a TFE/perfluoro (alkyl vinyl ether) copolymer, a TFE/ethylene copolymer (hereinafter referred to as ETFE), polyvinylidene fluoride, polyethylene, polypropylene, polyimide or polyphenylene sulfide. The material of the reinforcing member is preferably a fluorinated material such as PTFE, a TFE/hexafluoropropylene copolymer, a TFE/perfluoro(alkyl vinyl ether) copolymer, a ETFE or polyvinylidene fluoride, in view of the chemical durability.

The reinforcing member is preferably a porous product made of PTFE in view of the mechanical strength and the chemical durability.

In order to improve the durability, the polymer electrolyte membrane 24 may contain at least one type of atoms selected from the group consisting of cerium and manganese. Cerium or manganese will decompose hydrogen peroxide which is a substance to cause deterioration of the polymer electrolyte membrane 24, and cerium or manganese is preferably present in the form of ions in the polymer electrolyte membrane 24, and so long as it is present in the form of ions, it may be present in any state in the polymer electrolyte membrane 24.

The polymer electrolyte membrane 24 may contain silica or a heteropolyacid (such as zirconium phosphate, phosphorus molybdic acid or phosphorus tungstic acid) as a water retention agent to prevent drying.

The thickness of the polymer electrolyte membrane 24 is preferably from 10 to 30 μm, more preferably from 15 to 25 μm. When the thickness of the polymer electrolyte membrane 24 is at most the upper limit, it is possible to more efficiently suppress a deterioration of the power generation performance of the polymer electrolyte fuel cell under a low humidity condition. As the thickness of the polymer electrolyte membrane 24 is at least the lower limit, leakage of gas or electrical short circuiting can easily be suppressed.

The thickness of the polymer electrolyte membrane 24 is a value obtained in such a manner that a cross section of the polymer electrolyte membrane 24 is observed by SEM, thicknesses at three portions are measured, and they are averaged to obtain the thickness.

[Second Separator]

The second separator 18 is an electrically conductive porous separator. The second separator 18 and the first separator 12 may be the same or different.

As the porous separator to be used for the second separator 18, e.g. the same one as mentioned for the first separator is mentioned, and the preferred embodiment is also the same.

[Anode Interlayer]

The anode interlayer 16 is an electrically conductive layer containing carbon fibers having an average fiber diameter of from 30 to 300 nm and an ion exchange resin.

When the average fiber diameter of the carbon fibers contained in the anode interlayer 16 is at least 30 nm, such an interlayer has good gas diffusion property and water-discharging property, and when the average fiber diameter of the carbon fibers is at most 300 nm, the carbon fibers can suitably be dispersed in a dispersion medium. Further, by the anode interlayer 16 containing the ion exchange resin, the contact resistance between the second separator 18 and the anode catalyst layer 22 becomes small, whereby a higher cell voltage tends to be obtained.

The carbon fibers contained in the anode interlayer 16 may, for example, be the same one as mentioned for the cathode interlayer 14, and the preferred embodiment is also the same.

The carbon fibers contained in the anode interlayer 16 may be the same or different from the carbon fibers contained in the cathode interlayer 14. Further, the carbon fibers contained in the anode interlayer 16 may be one type or two or more types.

The ion exchange resin in the anode interlayer 16 is preferably a fluorinated ion exchange resin, more preferably a perfluorocarbon polymer having ionic groups (which may contain an etheric oxygen atom), particularly preferably the above-mentioned polymer (H) or polymer (Q), from the viewpoint of durability.

The ion exchange resin contained in the anode interlayer 16 may be the same or different from the ion exchange resin contained in the cathode interlayer 14. Further, the ion exchange resin contained in the anode interlayer 16 may be one type or two or more types.

The component, composition, thickness, etc. of the anode interlayer 16 may be the same or different from those of the cathode interlayer 14. Further, the anode interlayer 16 may be one consisting of only one layer, or one having a plurality of layers having different components, composition, etc. laminated.

The preferred embodiment of the anode interlayer 16 is the same as the preferred embodiment of the cathode interlayer.

The pore diameter of pores in the anode interlayer 16 is preferably from 0.1 to 2.0 μm, more preferably from 0.3 to 1.0 μm. When the pore diameter of pores in the anode interlayer 16 is within such a range, it is possible to obtain a higher cell voltage.

Here, the pore diameter of pores in the anode interlayer means a value of a pore diameter at a peak top, derived from the anode interlayer, in a pore distribution obtained by measurement by means of a mercury injection method, in the same manner as in the case of the cathode interlayer.

The thickness of the anode interlayer 16 is preferably from 20 to 60 µm, more preferably from 30 to 50 µm. When the thickness of the anode interlayer 16 is at least the lower limit, a good moisture retention can easily be obtained, and therefore drying of the anode catalyst layer 22 and the polymer electrolyte membrane 24 can easily be suppressed. When the thickness of the anode interlayer 16 is at most the upper limit, a cathode interlayer having good gas diffusion property and water-discharging property can easily be obtained.

The thickness of the anode interlayer is a value obtained in such a manner that a cross section of the anode interlayer is observed by SEM, thicknesses at three portions are measured, and they are averaged to obtain the thickness.

[Function Effect]

In the fuel cell 1, gas containing oxygen is supplied to the cathode catalyst layer 20 through the first separator 12 and the cathode interlayer 14, and gas containing hydrogen is supplied to the anode catalyst layer 22 through the second separator 18 and the anode interlayer 16, thereby to carry out power generation. Further, in the fuel cell 1, methanol may be supplied to the anode catalyst layer 22, thereby to carry out power generation.

In the fuel cell 1, a porous separator is used for the first separator 12, and therefore gas can easily be supplied uniformly to the cathode catalyst layer 20. In the fuel cell 1, the cathode interlayer 14 containing carbon fibers having an average fiber diameter of from 30 to 300 nm and an ion exchange resin is disposed between the first separator 12 and the cathode catalyst layer 20. By disposing such a cathode interlayer 14, the gas permeability will not be too high as compared with the case of disposing a gas diffusion layer, whereby it is possible to obtain high moisture retention, therefore the cathode catalyst layer 20 and the polymer electrolyte membrane 24 are hardly dried, and further the contact resistance between the first separator 12 and the cathode catalyst layer 20 becomes small. Accordingly, the fuel cell 1 can achieve a high cell voltage and excellent power generation performance.

Further, with respect to the fuel cell 1, also in the anode catalyst layer 22 side, gas can easily be supplied uniformly to the anode catalyst layer 22, the anode catalyst layer 22 is hardly dried, the contact resistance between the anode catalyst layer 22 and the second separator 18 will be small, and therefore a high cell voltage can easily be obtained.

Further, in the fuel cell 1, non-porous separators may be disposed at a further outer side of the first separator 12 and the second separator 18, as the case requires.

As the non-porous separators, it is possible to use known separators, for example, separators made of various conductive materials, such as a metal separator, a carbon separator and a separator made of a material having graphite and a resin mixed.

[Production Process]

A process for producing the polymer electrolyte fuel cell of the present invention can be classified into a process (X) and a process (Y).

Process (X): A process of disposing an interlayer-provided separator having a cathode interlayer formed on the first separator and a membrane/electrode assembly so that the cathode interlayer is in contact with a cathode catalyst layer.

Process (Y): A process of disposing a first separator on the cathode interlayer side of an interlayer-provided membrane/electrode assembly having the cathode interlayer formed on the cathode catalyst layer side of the membrane/electrode assembly.

Now, the process (X) and the process (Y) will be described in detail with reference to the case of the fuel cell 1.

(Process (X1))

The process (X1) for producing the fuel cell 1 comprises the following steps (X11) to (X14).

(X11): The cathode interlayer 14 is formed on the first separator 12 to obtain a cathode interlayer-provided separator.

(X12): The anode interlayer 16 is formed on the second separator 18 to obtain an anode interlayer-provided separator.

(X13): The cathode catalyst layer 20 and the anode catalyst layer 22 are respectively disposed on both sides of the polymer electrolyte membrane 24 to form the membrane/electrode assembly 10.

(X14): The cathode interlayer-provided separator is disposed on the cathode catalyst layer 20 side in the membrane/electrode assembly 10 so that the cathode interlayer 14 is in contact with the cathode catalyst layer 20, and on the anode catalyst layer 22 side, the anode interlayer-provided separator is disposed so that the anode interlayer 16 is in contact with the anode catalyst layer 22.

In the step (X11), the method of forming the cathode interlayer 14 on the first separator 12 may, for example, be a method of coating the first separator 12 with a paste for forming a cathode interlayer, containing carbon fibers and an ion exchange resin, followed by drying.

The coating method may be a known method.

A temperature for the drying is preferably from 40 to 130° C.

The paste for forming a cathode interlayer may be one having the carbon fibers and the ion exchange resin dispersed in a dispersion medium.

The dispersion medium is preferably a dispersion medium containing an alcohol and water. Further, a fluorinated solvent (except for the following fluorinated alcohol) may be further added thereto.

The alcohol may, for example, be a non-fluorinated alcohol (such as methanol, ethanol, 1-propanol or 2-propanol) or a fluorinated alcohol (such as 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol).

The proportion of the alcohol in the dispersion medium (100 mass %) is preferably from 30 to 70 mass %, more preferably from 40 to 60 mass %. When the proportion of the alcohol is within the above range, the coating property and the dispersion stability will be good.

The proportion of water in the dispersion medium (100 mass %) is preferably from 30 to 60 mass %, more preferably from 40 to 60 mass %. When the proportion of water is within the above range, the coating property and the dispersion stability will be good.

The solid content of the paste for forming a cathode interlayer is preferably from 5 to 40 mass %, more preferably from 8 to 30 mass %, particularly preferably from 10 to 25 mass %. When the solid content is at least the lower limit, a cathode interlayer can easily be formed by single coating, by adjusting the viscosity of the paste with a composition of a dispersion medium. When the solid content is at most the upper limit, a dispersed state of the carbon fibers can easily be maintained over a long period.

The solid content of the paste for forming a cathode interlayer is represented by a proportion of sum of masses of the carbon fibers and the ion exchange resin based on the total mass of the paste.

The paste for forming a cathode interlayer may, for example, be prepared as follows.

An ion exchange resin is dispersed in a part of a dispersion medium to prepare a dispersion of the ion exchange resin.

Carbon fibers, the rest of the dispersion medium and the above dispersion of an ion exchange resin are mixed and stirred, whereby the carbon fibers are dispersed in the dispersion medium to obtain the paste for forming a cathode interlayer.

From the viewpoint that the carbon fibers are arranged to have a proper length and thereby to improve the dispersion property during stirring, it is preferred to use e.g. a ultrasonic disperser, a rotation/revolution mixer, a homogenizer or a beads mill for stirring the mixed fluid.

The step (X12) can be carried out in the same manner as in the step (X11).

The dispersion medium to be used for the paste for forming an anode interlayer may, for example, be the same as in the paste for forming a cathode interlayer, and the preferred embodiment is also the same.

The preferred embodiment of the solid content of the paste for forming an anode interlayer is the same as the preferred embodiment of the solid content of the paste for forming a cathode interlayer.

The step (X13) may be a known method.

The step (X14) may be a known method except that a cathode interlayer-provided separator and an anode interlayer-provided separator are used.

(Process (Y1))

The process (Y1) for producing the fuel cell 1 comprises the following steps (Y11) and (Y12).

(Y11): The cathode interlayer 14 is formed on the cathode catalyst layer 20 side of the membrane/electrode assembly 10, and the anode interlayer 16 is formed on the anode catalyst layer 22 side of the membrane/electrode assembly 10 to obtain an interlayer-provided membrane/electrode assembly.

(Y12): The first separator 12 is disposed on the cathode interlayer 14 side of the interlayer-provided membrane/electrode assembly, and the second separator 18 is disposed on the anode catalyst layer 22 side.

In the step (Y11), a method for forming the cathode interlayer 14 and the anode interlayer 16 on both sides of the membrane/electrode assembly 10 may, for example, be mentioned below.

A paste for forming a cathode interlayer is applied on a substrate, followed by drying to form the cathode interlayer 14, and thereafter a paste for forming a cathode catalyst layer is applied on the cathode interlayer 14, followed by drying to form the cathode catalyst layer 20, whereby a decal for transferring an interlayer-provided cathode catalyst layer is obtained. Further, a paste for forming an anode interlayer is applied on the substrate, followed by drying to form the anode interlayer 16, and thereafter a paste for forming an anode catalyst layer is applied on the anode interlayer 16, followed by drying to form the anode catalyst layer 22, whereby a decal for transferring an interlayer-provided anode catalyst layer is obtained. Then, the cathode interlayer and the cathode catalyst layer of the decal for transferring an interlayer-provided cathode catalyst layer are transferred on one side of a polymer electrolyte membrane, and on the other side of the polymer electrolyte membrane, the anode interlayer and the anode catalyst layer of the decal for transferring an interlayer-provided anode catalyst layer are transferred.

As the substrate, a known film to be used for producing a membrane/electrode assembly, such as an ETFE film, may be used.

As the paste for forming a cathode catalyst layer and the paste for forming an anode catalyst layer, known pastes may be employed. For example, one having a catalyst and an ion exchange resin dispersed in the dispersion medium mentioned in explanation of the paste for forming a cathode interlayer may be mentioned.

The transferring method may, for example, be a hot pressing method, a hot roll pressing method or an ultrasonic fusion method, and a hot pressing method is preferred from the viewpoint of the in-plane uniformity.

The temperature of the pressing plate in the press machine is preferably from 100 to 150° C.

The pressing pressure is preferably from 0.5 to 4.0 MPa.

As the step (Y12), a know method may be employed except that the interlayer-provided membrane/electrode assembly is used.

Further, to produce the fuel cell 1, either the cathode interlayer 14 or the anode interlayer 16 may be disposed by the process (X), and the other interlayer is disposed by the process (Y).

<Other Embodiments>

The polymer electrolyte fuel cell of the present invention is not limited to the above fuel cell 1.

Specifically, as the polymer electrolyte fuel cell of the present invention, known embodiments may be employed except that the first separator is a porous separator, and the above-mentioned specific cathode interlayer is disposed between the cathode catalyst layer and the first separator so as to be in direct contact with the cathode catalyst layer and the first separator.

Figure 2:
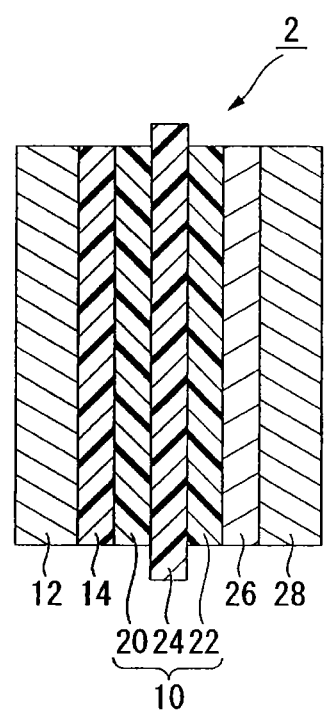
FIG. 2 is a cross-sectional view illustrating another example of the polymer electrolyte fuel cell of the present invention.

As another embodiment of the polymer electrolyte fuel cell of the present invention, a polymer electrolyte fuel cell 2 (hereinafter referred to as "fuel cell 2") shown in FIG. 2 may, for example, be mentioned. In FIG. 2, for the same components as in FIG. 1, the same reference symbols as in FIG. 1 are used without explanation of them.

As shown in FIG. 2, the fuel cell 2 in this embodiment has the first separator 12, the cathode interlayer 14, the membrane/electrode assembly 10, the gas diffusion layer 26 and the second separator 28.

The second separator 28 is disposed on the anode catalyst layer 22 side of the membrane/electrode assembly 10. The gas diffusion layer 26 is disposed between the anode catalyst layer 22 of the membrane/electrode assembly 10 and the second separator 28 so as to be in direct contact with the anode catalyst layer 22 and the second separator 28.

[Gas Diffusion Layer]

The gas diffusion layer 26 is a layer made of an electrically conductive gas diffusing substrate.

The gas diffusing substrate may, for example, be a carbon paper, a carbon cloth or a carbon felt.

A conventional gas diffusing substrate usually has pores of at least 10 µm, and a gas diffusion layer having a microporous layer further has pores of at most 0.1 µm.

It is preferred that the surface of the gas diffusion layer 26, with which the anode catalyst layer 22 is in contact, is treated for water repellency by a solution or dispersion containing a water repellent fluorinated polymer. By such water repellent treatment, water generated in the anode catalyst layer 22 tends to scarcely block the pores of the gas diffusion layer 26, whereby deterioration of the gas diffusion property can be suppressed.

It is more preferred that the surface of the gas diffusion layer 26, with which the anode catalyst layer 22 is in contact, is treated for water repellency by a dispersion containing a water repellent fluorinated polymer and electrically conducting carbon from the viewpoint of the electrical conductivity of the membrane/electrode assembly 10.

The water repellent fluorinated polymer may, for example, be PTFE.

The electrically conductive carbon may, for example, be carbon black.

The thickness of the gas diffusion layer 26 is preferably from 100 to 400 µm, more preferably from 120 to 300 µm.

The thickness of the gas diffusion layer is obtained in such a manner that thicknesses at four portions are measured by means of a Digimatic Indicator (543-250, manufactured by MITUTOYO CORPORATION, flat measuring terminal: 5 mm in diameter), and they are averaged to obtain the thickness of the gas diffusion layer.

[Second Separator]

The second separator 28 may be a porous separator or a non-porous separator.

In a case where the second separator 28 is a porous separator, the second separator 28 and the first separator 12 may be the same or different.

The porous separator to be used as the second separator 28 may, for example, be the same as in the first separator, and the preferred embodiment is also the same.

As the non-porous separators, it is possible to use known separators, for example, separators made of various conductive materials, such as a metal separator, a carbon separator and a separator made of a material having graphite and a resin mixed.

[Function Effect]

In the fuel cell 2, as in the case of the fuel cell 1, gas can easily be supplied uniformly to the cathode catalyst layer 20, the cathode interlayer 14 containing carbon fibers having an average fiber diameter of from 30 to 300 nm and an ion exchange resin is disposed, thereby to suppress drying of the cathode catalyst layer 20, and further the contact resistance between the first separator 12 and the cathode catalyst layer 20 will be small, whereby a high cell voltage can be obtained.

[Production Process]

A process for producing the fuel cell 2 may, for example, be a process (X2) or a process (Y2).

The process (X2) for producing the fuel cell 2 comprises the following steps (X21) to (X23).

(X21): The cathode interlayer 14 is formed on the first separator 12 to obtain a cathode interlayer-provided separator.

(X22): The cathode catalyst layer 20 and the anode catalyst layer 22 are respectively disposed on both sides of the polymer electrolyte membrane 24 to form the membrane/electrode assembly 10.

(X23): The cathode interlayer-provided separator is disposed on the cathode catalyst layer 20 side of the membrane/electrode assembly 10 so that the cathode interlayer 14 is in contact with the cathode catalyst layer 20, and the gas diffusion layer 26 and the second separator 28 are disposed on the anode catalyst layer 22 side.

The step (X21) and the step (X22) may be carried out in the same manner as in the step (X11) and the step (X13).

As the step (X23), a known method may be employed except that the cathode interlayer-provided separator is used.

The process (Y2) for producing the fuel cell 2 comprises the following steps (Y21) and (Y22).

(Y21): The cathode interlayer 14 is formed on the cathode catalyst layer 20 side of the membrane/electrode assembly 10 to obtain an interlayer-provided membrane/electrode assembly.

(Y22): The first separator 12 is disposed on the cathode interlayer 14 side of the interlayer-provided membrane/electrode assembly, and the gas diffusion layer 26 and the second separator 28 are disposed on the anode catalyst layer 22 side of the interlayer-provided membrane/electrode assembly.

The step (Y21) may be carried out in the same manner as in the step (Y11) except that no anode interlayer is formed on the anode catalyst layer 22 side.

As the step (Y22), a known method may be employed except that the interlayer-provided membrane/electrode assembly obtained in the step (Y21) is used.

Further, the polymer electrolyte fuel cell of the present invention may be such that neither the anode interlayer nor the gas diffusion layer is disposed between the anode catalyst layer of the membrane/electrode assembly and the second separator, and the anode catalyst layer is thereby in direct contact with the second separator.

EXAMPLES

Now, the present invention will be described in detail with reference to Examples, but it should be understood that the present invention is by no means thereby restricted. Examples 1 to 6 are Examples of the present invention, and Examples 7 to 11 are Comparative Examples.

[Measurement of Average Pore Diameter of First Separator]

The average pore diameter of the porous separator was obtained in such a manner that a foamed metal plate used as the first separator was photographed by SEM to obtain an image of the pores, and then the average value of pore diameters of 100 pores randomly selected from the image was measured by an image dimension measurement/powder measurement soft (QuickGrain Standard, manufactured by Inotech Co., Ltd.).

[Measurement of Pore Diameter of Cathode Interlayer]

On a commercially available gas diffusion layer (X0086 T10X6, manufactured by NOK Corporation), a 30 µm-thick cathode interlayer was formed, a pore distribution was measured by means of a mercury injection method using AutoPore IV9500 (manufactured by Shimadzu Corporation), and a pore diameter at a peak top, derived from the cathode interlayer was regarded as a pore diameter of the cathode interlayer.

[Polymer (H1) Dispersion]

(Dispersion (A))

An acid form polymer (H1) (ion exchange capacity: 1.1 meq/g dry resin) comprising units based on TFE and units (U1-21) was dispersed in a dispersion medium of ethanol/water=6/4 (mass ratio) to prepare a dispersion (A) having a solid content of 20 mass %.

(Dispersion (B))

An acid form polymer (H1) (ion exchange capacity: 1.1 meq/g dry resin) comprising units based on TFE and units (U1-2), was dispersed in a dispersion medium of ethanol/water=6/4 (mass ratio) to prepare a dispersion (B) having a solid content of 27.0 mass %.

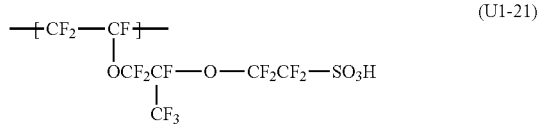

(U1-21)

[Paste for Forming Cathode Catalyst Layer]

To 10 g of a catalyst (TEC10E50E, manufactured by Tanaka Kikinzoku Kogyo) having a platinum supported on a carbon support so as to be contained in a proportion of 50 mass % based on the total mass of the catalyst, 56.6 g of distilled water, 53.4 g of ethanol and 20.0 g of the dispersion (A) were added in a nitrogen atmosphere, followed by thorough stirring. Further, a planetary ball mill was used to carry out mixing and pulverizing to obtain a paste for forming a cathode catalyst layer.

[Paste for Forming Anode Catalyst Layer]

To 10 g of a catalyst (TEC10EA20E, manufactured by Tanaka Kikinzoku Kogyo) having a platinum supported on a carbon support so as to be contained in a proportion of 20 mass % based on the total mass of the catalyst, 10.2 g of distilled water, 15.4 g of ethanol and 32.0 g of the dispersion (A) were added in a nitrogen atmosphere, followed by thorough stirring. Further, a planetary ball mill was used to carry out mixing and pulverizing to obtain a paste for forming an anode catalyst layer.

[Paste for Forming Cathode Interlayer]

(Paste-1 for Forming Interlayer)

To 50 g of vapor phase-grown carbon fibers (VGCF-H, manufactured by Showa Denko K.K., average fiber diameter: 150 nm, fiber length: 10 to 20 µm), 125.0 g of the dispersion (A) was added, and further 12.5 g of water was added thereto, followed by thorough stirring and further by dispersing and mixing by means of an ultrasonic disperser to obtain a paste-1 for forming an interlayer.

(Paste-2 for Forming Interlayer)

20 g of the dispersion (B), 12.2 g of ethanol and 6.6 g of 1,1,2,2,3,3,4-heptafluorocyclopentane (tradename: ZEORORA H, manufactured by Nippon Zeon Corporation) were thoroughly mixed by a spoon, followed by kneading by a rotation/revolution mixer (THINKY MIXER ARE-310, manufactured by THINKY) to obtain a gelatinous polymer (H1) dispersed product having high viscosity. To 35.9 g of the polymer (H1) dispersed product, 10 g of vapor phase-grown carbon fibers (VGCF-H, manufactured by Showa Denko K.K., average fiber diameter: 150 nm, fiber length: 10 to 20 µm), 4.5 g of ethanol and 24.8 g of distilled water were added, and treated by a rotation/revolution mixer to obtain a paste-2 for forming an interlayer.

(Paste-3 for Forming Interlayer)

20 g of the dispersion (B), 12.2 g of ethanol and 6.6 g of 1,1,2,2,3,3,4-heptafluorocyclopentane (tradename: ZEORORA H, manufactured by Nippon Zeon Corporation) were thoroughly mixed by a spoon, followed by kneading by a rotation/revolution mixer (THINKY MIXER ARE-310, manufactured by THINKY) to obtain a gelatinous polymer (H1) dispersed product having high viscosity. To 35.9 g of the polymer (H1) dispersed product, 10 g of carbon nanofibers NT-5 (manufactured by Hodogaya Chemical Co., Ltd., average fiber diameter: 50 nm, fiber length: 5 to 10 µm), 17.1 g of ethanol and 37.0 g of distilled water were added, and treated by a rotation/revolution mixer to obtain a paste-3 for forming an interlayer.

(Paste-4 for Forming Interlayer)

A paste-4 for forming an interlayer was obtained in the same manner as in formation of the paste-2 for forming an interlayer except that 10 g of carbon black Vulcan (registered trademark) XC72R was used instead of 10 g of the vapor phase-grown carbon fibers.

(Pate-5 for Forming Interlayer)

To 10 g of carbon fibers (DIALEAD (registered trademark) K223HG, manufactured by Mitsubishi Chemical Functional Products, Inc., average fiber diameter: 11 µm, fiber length: 6 mm), 17.1 g of ethanol, 2.1 g of distilled water and 3.7 g of the dispersion (B) were added and stirred, followed by mixing and dispersing them by using a homogenizer. Further, 9.4 g of 1,1,2,2,3,3,4-heptafluorocyclopentane (ZEORORA H, manufactured by Nippon Zeon Corporation) was added, followed by mixing and dispersing by using a homogenizer to obtain a paste-5 for forming an interlayer.

(Pate-6 for Forming Interlayer)

The paste-6 for forming an interlayer was obtained in the same manner as in formation of the paste-2 for forming an interlayer except that 10 g of carbon fibers (milled fibers (registered trademark) MLD300, manufactured by Toray Industries, Inc., average fiber diameter: 7 µm, fiber length: 130 µm) were used instead of 10 g of the vapor phase-grown carbon fibers (VGCF-H, manufactured by Showa Denko K.K., average fiber diameter: 150 nm, fiber length: 10 to 20 µm).

Example 1

Process (X2)

On the surface of a foamed metal plate (manufactured by Mitsubishi Materials Corporation, material: SUS316L, average pore diameter: 150 µm, thickness: 1 mm, gold-plated) as the first separator, the paste-2 for forming an interlayer was applied by an applicator so that the coating thickness would be 40 µm, followed by drying to obtain a cathode interlayer-provided foamed metal plate.

Further, on the surface of an ETFE film, the paste for forming a cathode catalyst layer was applied by means of a die coater so that the amount of platinum would be 0.2 mg/cm$^2$, followed by drying to obtain a decal for transferring a cathode catalyst layer.

Further, on the surface of an ETFE film, the paste for forming an anode catalyst layer was applied by means of a die coater so that the amount of platinum would be 0.05 mg/cm$^2$, followed by drying to obtain a decal for transferring an anode catalyst layer.

Using, as a polymer electrolyte membrane, an ion exchange membrane having a thickness of 20 µm, made of a perfluorocarbon polymer having —SO$_3^-$H$^+$ (tradename: FLEMION, manufactured by Asahi Glass Company, Limited, ion exchange capacity: 1.1 meq/g dry resin, thickness: 25 µm), the anode catalyst layer of the decal for transferring an anode catalyst layer and the cathode catalyst layer of the decal for transferring a cathode catalyst layer were respectively transferred on both sides of the polymer electrolyte membrane by means of a hot pressing method to obtain a membrane/electrode assembly (electrode area: 25 cm$^2$).

On the outside of the cathode catalyst layer of the resulting membrane/electrode assembly, a cathode interlayer-provided foamed metal plate was disposed so that the cathode interlayer was in contact with the cathode catalyst layer, and further a carbon separator was disposed on the outside of the foamed metal plate. Then, on the outside of the anode catalyst layer of the membrane/electrode assembly, a gas diffusion layer (GDL X0086 IX51 CX173, manufactured by NOK Corporation) was disposed, and further a carbon separator was disposed on the outside thereof to obtain a power generation cell.

Example 2

Process (X2)

A cell for power generation was obtained in the same manner as in Example 1 except that a foamed metal plate (manufactured by Mitsubishi Material Corporation, material: SUS316L, thickness: 1 mm, gold-plated) having an average pore diameter of 300 μm was used as the first separator.

Example 3

Process (Y2)

On the surface of an ETFE film, the paste-1 for forming an interlayer was applied by means of a die coater so that the solid content would be 3 mg/cm$^2$, followed by drying to form a cathode interlayer having a thickness of 40 μm. Then, on the cathode interlayer, a paste for forming a cathode catalyst layer was applied by means of a die coater so that the amount of platinum would be 0.2 mg/cm$^2$, followed by drying to form a cathode catalyst layer, whereby a decal for transferring an interlayer-provided cathode catalyst layer was obtained.

Further, a decal for transferring an anode catalyst layer was obtained in the same manner as in Example 1.

Then, on one side of the same polymer electrolyte membrane used in Example 1, the anode catalyst layer of the decal for transferring an anode catalyst layer was transferred by means of a hot pressing method. Further, on the other side of the polymer electrolyte membrane, the cathode interlayer and the cathode catalyst layer of the decal for transferring an interlayer-provided cathode catalyst layer were transferred by means of a hot pressing method so that the cathode catalyst layer was in contact with the polymer electrolyte membrane, whereby a cathode interlayer-provided membrane/electrode assembly (electrode area: 25 cm$^2$) was obtained.

on the outside of the cathode interlayer of the resulting cathode interlayer-provided membrane/electrode assembly, a foamed metal plate (manufactured by Mitsubishi Material Corporation, material: SUS316L, average pore diameter: 300 μm, thickness: 1 mm, gold-plated) was disposed, and on the outside of the foamed metal plate, a carbon separator was further disposed. Then, on the outside of the anode catalyst layer of the membrane/electrode assembly, a gas diffusion layer (GDL X0086 IX51 CX173, manufactured by NOK Corporation) was disposed, and further a carbon separator was disposed on its outside to obtain a power generation cell.

Example 4

Process (X2)

A power generation cell was obtained in the same manner as in Example 2 except that the paste-2 for forming an interlayer was applied by means of an applicator so that the coating thickness would be 10 μm, followed by drying to obtain a cathode interlayer-provided foamed metal plate.

Example 5

Process (X2)

A power generation cell was obtained in the same manner as in Example 2 except that the paste-2 for forming an interlayer was applied by means of an applicator so that the coating thickness would be 70 μm, followed by drying to obtain a cathode interlayer-provided foamed metal plate.

Example 6

Process (Y2)

A power generation cell was obtained in the same manner as in Example 3 except that the paste-3 for forming an interlayer was used instead of the paste-1 for forming an interlayer.

Example 7

A power generation cell was obtained in the same manner as in Example 1 except that a foamed metal plate (manufactured by Mitsubishi Material Corporation, material: SUS316L, average pore diameter: 300 μm, thickness: 1 mm, gold-plated) having no cathode interlayer formed thereon was used instead of the cathode interlayer-provided foamed metal plate.

Example 8

A membrane/electrode assembly (electrode area: 25 cm$^2$) was obtained in the same manner as in Example 1. On the outside of the cathode catalyst layer of the resulting membrane/electrode assembly, a gas diffusion layer (GDL MFW, manufactured by Mitsubishi Rayon Co., Ltd.) was disposed, further, on its outside, a foamed metal plate (manufactured by Mitsubishi Material Corporation, material: SUS316L, average pore diameter: 300 μm, thickness: 1 mm, gold-plated) was disposed, and further on its outside, a carbon separator was disposed. Further, on the outside of the anode catalyst layer of the membrane/electrode assembly, a gas diffusion layer (GDL X0086 IX51 CX173, manufactured by NOK Corporation) was disposed, and further on its outside, a carbon separator was disposed.

Examples 9 and 10

Process (X2)

A power generation cell was obtained in the same manner as in Example 2 except that a paste for forming an interlayer to be used was changed as shown in Table 1.

Examples 11

Process (Y2)

A power generation cell was obtained in the same manner as in Example 3 except that the paste-6 for forming an interlayer was used instead of the paste-1 for forming an interlayer.

[Measurement of Cell Voltage]

To the resulting power generation cell, hydrogen (utilization ratio: 70%)/oxygen (utilization ratio: 50%) were supplied under ambient pressure, and the cell voltage at the initial stage of the operation at a cell temperature of 80° C.

and at a current density of 1.0 A/cm² was measured. Further, hydrogen with a dew point of 53° C. was supplied to the anode catalyst layer side, and air with a dew point of 53° C. was supplied to the cathode catalyst layer side (relative humidity in the cell: 30% RH).

The measurement results of the average pore diameter of the first separator and the pore diameter of the cathode interlayer and the measurement result of the cell voltage in each Example are shown in Table 1.

Figure 3:
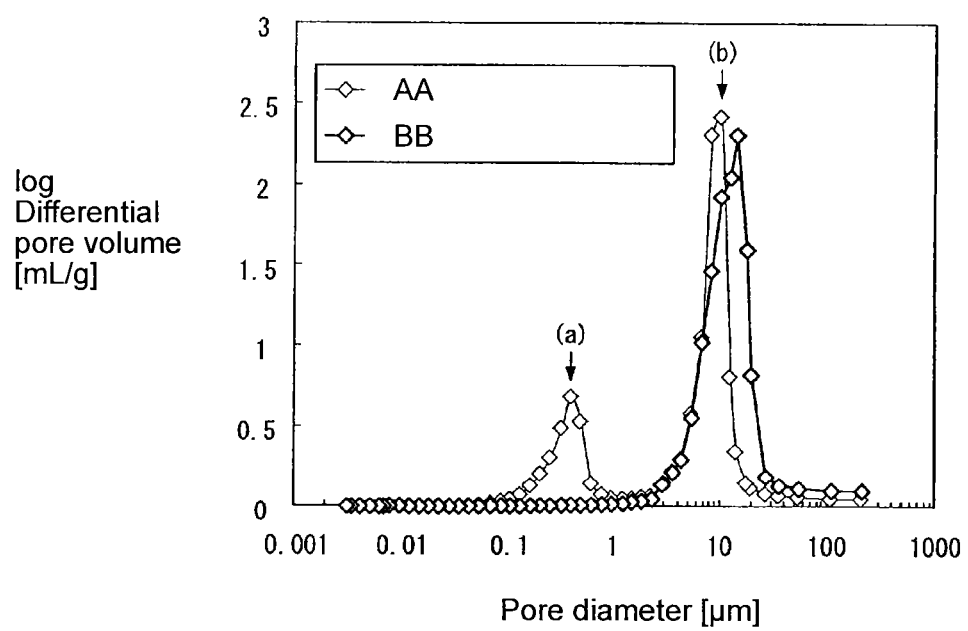
FIG. 3 is a graph showing results of comparison of a pore distribution between a gas diffusion layer (GDL) substrate having a cathode interlayer in Example 1 formed thereon and a GDL substrate alone.

Further, as one example of a measurement result of a pore distribution of the cathode interlayer, measurement results of a pore distribution of one having the cathode interlayer in Example 1 formed on a gas diffusion layer (cathode interlayer+GDL substrate) and a pore distribution of a gas diffusion layer alone (GDL substrate alone) are shown in FIG. 3. Since the peak (b) in the pore distribution of the cathode interlayer+the GDL substrate is identical with the peak observed in the case of the GDL substrate alone, the peak (b) is found to be a peak derived from the gas diffusion layer, and the peak (a) is found to be a peak derived from the cathode interlayer.

REFERENCE SYMBOLS 1,2: Polymer electrolyte fuel cell
10: Membrane/electrode assembly
12: First separator
14: Cathode interlayer
16: Anode interlayer
18, 28: Second separator
20: Cathode catalyst layer
22: Anode catalyst layer
24: Polymer electrolyte membrane
26: Gas diffusion layer

What is claimed is:

1. A polymer electrolyte fuel cell, comprising
a membrane/electrode assembly having a cathode catalyst layer, an anode catalyst layer and a polymer electrolyte membrane disposed between the cathode catalyst layer and the anode catalyst layer,
a gas permeable porous first metal separator disposed on the cathode catalyst layer side of the membrane/electrode assembly,

TABLE 1

| | First separator | Cathode interlayer | | | | | | | | | Cell voltage [V] |
|---|---|---|---|---|---|---|---|---|---|---|---|
| | | | | Ion exchange resin | | Carbon fibers | | | | | |
| | Average pore diameter [μm] | Paste for forming interlayer | Production process | Type | Content [mass %] | Average fiber diameter [nm] | Fiber length [μm] | Content [mass %] | Pore diameter [μm] | Thickness [μm] | |
| Ex. 1 | 150 | 2 | (X2) | H1 | 33.3 | 150 | 10-20 | 66.7 | 0.5 | 40 | 0.65 |
| Ex. 2 | 300 | 2 | (X2) | H1 | 33.3 | 150 | 10-20 | 66.7 | 0.5 | 40 | 0.63 |
| Ex. 3 | 300 | 1 | (Y2) | H1 | 33.3 | 150 | 10-20 | 66.7 | 0.5 | 40 | 0.65 |
| Ex. 4 | 300 | 2 | (X2) | H1 | 33.3 | 150 | 10-20 | 66.7 | 0.5 | 10 | 0.60 |
| Ex. 5 | 300 | 2 | (X2) | H1 | 33.3 | 150 | 10-20 | 66.7 | 0.5 | 70 | 0.61 |
| Ex. 6 | 300 | 3 | (Y2) | H1 | 33.3 | 50 | 5-10 | 66.7 | 0.1 | 40 | 0.60 |
| Ex. 7 | 300 | — | — | — | — | — | — | — | — | — | 0 |
| Ex. 8 | 300 | | | Gas diffusion layer used. | | | | | 35 | 200 | 0.38 |
| Ex. 9 | 300 | 4 | (X2) | H1 | 33.3 | — | — | 66.7 | 0.06 | 40 | 0.42 |
| Ex. 10 | 300 | 5 | (X2) | H1 | 10.0 | 11000 | 50-100 | 90.0 | 12.0 | 40 | 0.37 |
| Ex. 11 | 300 | 6 | (Y2) | H1 | 33.3 | 7000 | 50-100 | 66.7 | 3.0 | 40 | 0.45 |

As shown in Table 1, in each of Examples 1 to 6 where a cathode interlayer containing carbon fibers having an average fiber diameter of from 30 to 300 nm and an ion exchange resin was formed between a cathode catalyst layer and a first separator, it was possible to obtain high cell voltage and high power generation performance.

On the other hand, in Example 7 where no cathode interlayer was formed, the cell voltage was 0V, and therefore it was impossible to obtain power generation performance. Further, in Example 8 where a gas diffusion layer was used but no cathode interlayer was formed, the cell voltage was low as compared with Examples 1 to 6, and the power generation performance was poor. Further, also in Example 9 where a cathode interlayer contains no carbon fibers and Examples 10 and 11 where the average fiber diameter of carbon fibers contained in a cathode interlayer exceeded 300 μm, the cell voltage was low as compared with Examples 1 to 6, and therefore the power generation performance was poor.

The entire disclosures of Japanese Patent Application No. 2013-085045 filed on Apr. 15, 2013 and Japanese Patent Application No. 2013-167828 filed on Aug. 12, 2013 including specifications, claims, drawings and summaries are incorporated herein by reference in their entireties.

a second separator disposed on the anode catalyst layer side of the membrane/electrode assembly, and
a gas permeable hydrophilic cathode interlayer disposed between the cathode catalyst layer and the gas permeable porous first metal separator so as to be in direct contact with them,
wherein the gas permeable hydrophilic cathode interlayer contains carbon fibers having an average fiber diameter of from 30 to 300 nm and an ion exchange resin, and
wherein the gas permeable hydrophilic cathode interlayer is a single layer or a laminated layer with two or more layers, and the single layer or each layer of the laminated layer has pores with a pore diameter of from 0.3 to 2.0 μm.

2. The polymer electrolyte fuel cell according to claim 1, wherein the gas permeable porous first metal separator has an average pore diameter of from 20 to 500 μm.

3. The polymer electrolyte fuel cell according to claim 1, wherein the gas permeable hydrophilic cathode interlayer has a thickness of from 20 to 60 μm.

4. The polymer electrolyte fuel cell according to claim 1, wherein the second separator is a porous separator, and said polymer electrolyte fuel cell has an anode interlayer containing carbon fibers having an average fiber diameter of from 30 to 300 nm and an ion exchange resin, which is disposed between the anode catalyst layer and the second separator so as to be in direct contact with the anode catalyst layer and the second separator.

5. The polymer electrolyte fuel cell according to claim 4, wherein the anode interlayer has pores with a pore diameter of from 0.1 to 2.0 µm.

6. The polymer electrolyte fuel cell according to claim 5, wherein the anode interlayer has a thickness of from 20 to 60 µm.

7. The polymer electrolyte fuel cell according to claim 4, wherein the second separator has an average pore diameter of from 20 to 500 µm.

8. The polymer electrolyte fuel cell according to claim 4, wherein the anode interlayer has a thickness of from 20 to 60 µm.

9. The polymer electrolyte fuel cell according to claim 1, wherein said gas permeable porous first metal separator is a separator selected from the group consisting of a foamed metal plate, a sintered body of metal fibers and a sintered body of metal powder.

10. The polymer electrolyte fuel cell according to claim 1, wherein
the single gas permeable hydrophilic cathode interlayer or each layer of the laminated gas permeable hydrophilic cathode interlayer has pores with a pore diameter of from 0.3 to 0.5 µm,
the gas permeable porous first metal separator has an average pore diameter of from 150 to 300 µm, and
the gas permeable hydrophilic cathode interlayer has a thickness of from 20 to 40 µm.

* * * * *